June 16, 1964 L. L. MULLEN 3,137,041
EXPANDABLE HOUSE TRAILER
Filed Sept. 21, 1962 3 Sheets-Sheet 1
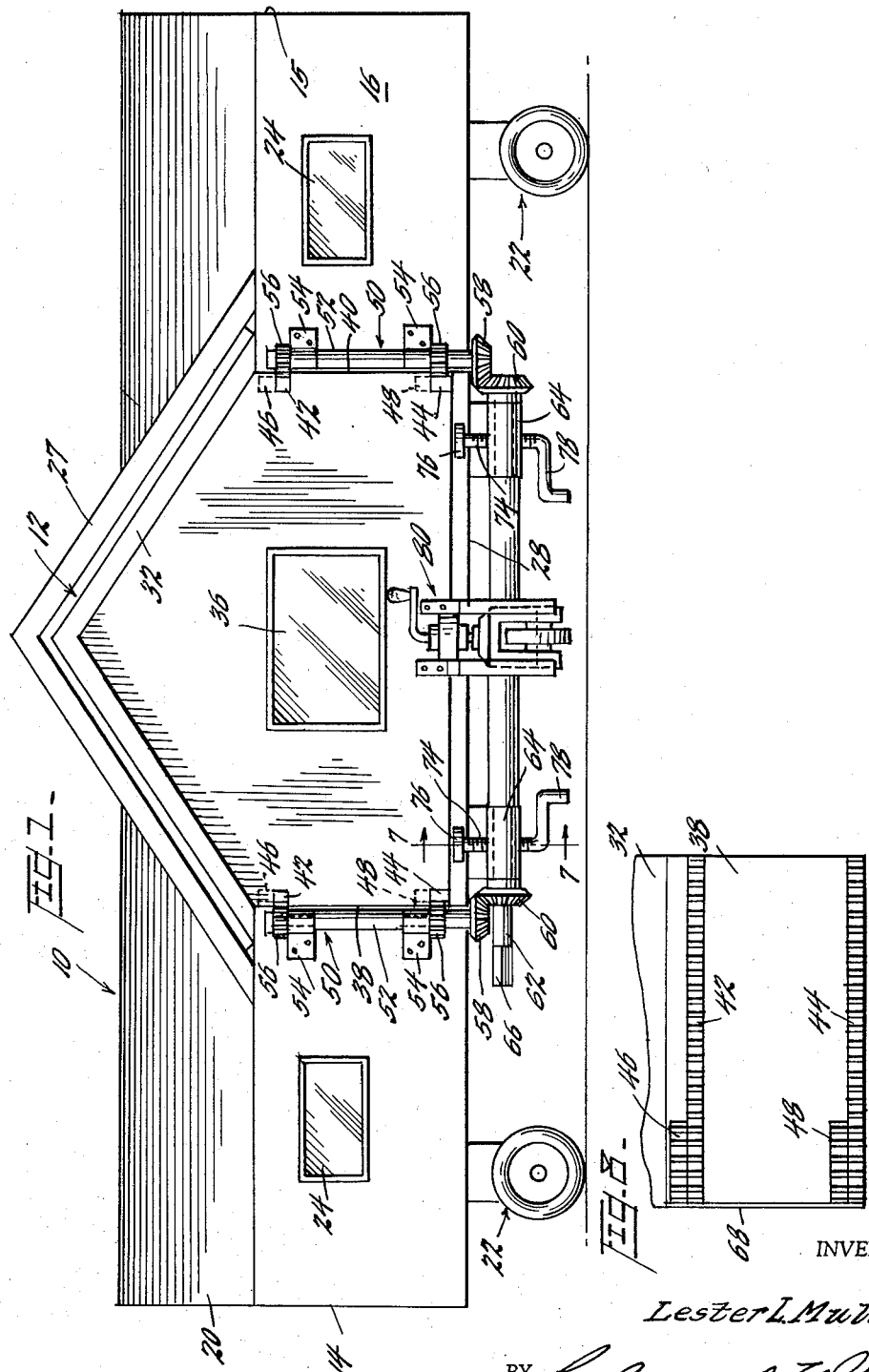
INVENTOR
Lester L. Mullen,
BY Parker and Walsh
ATTORNEYS

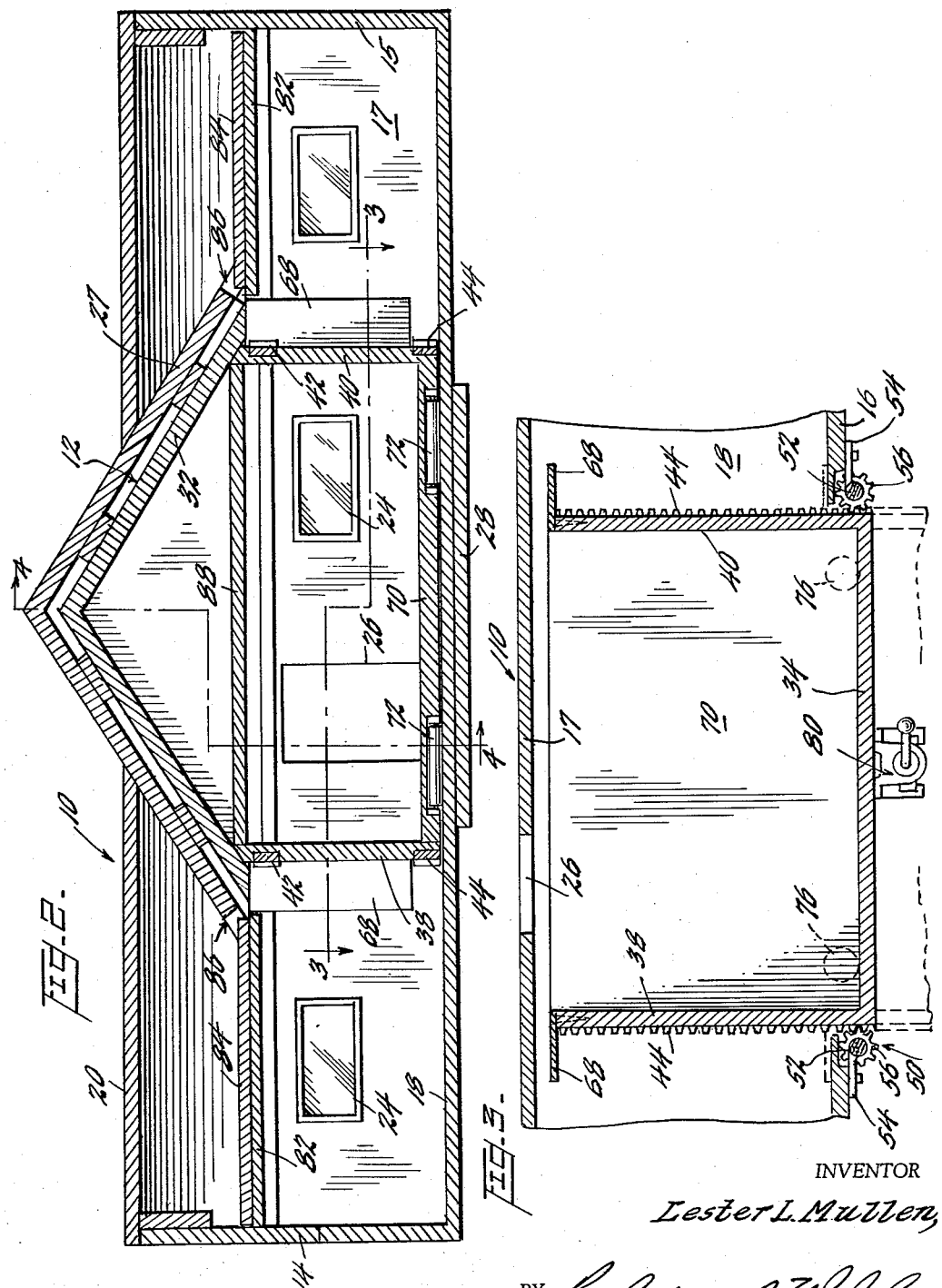

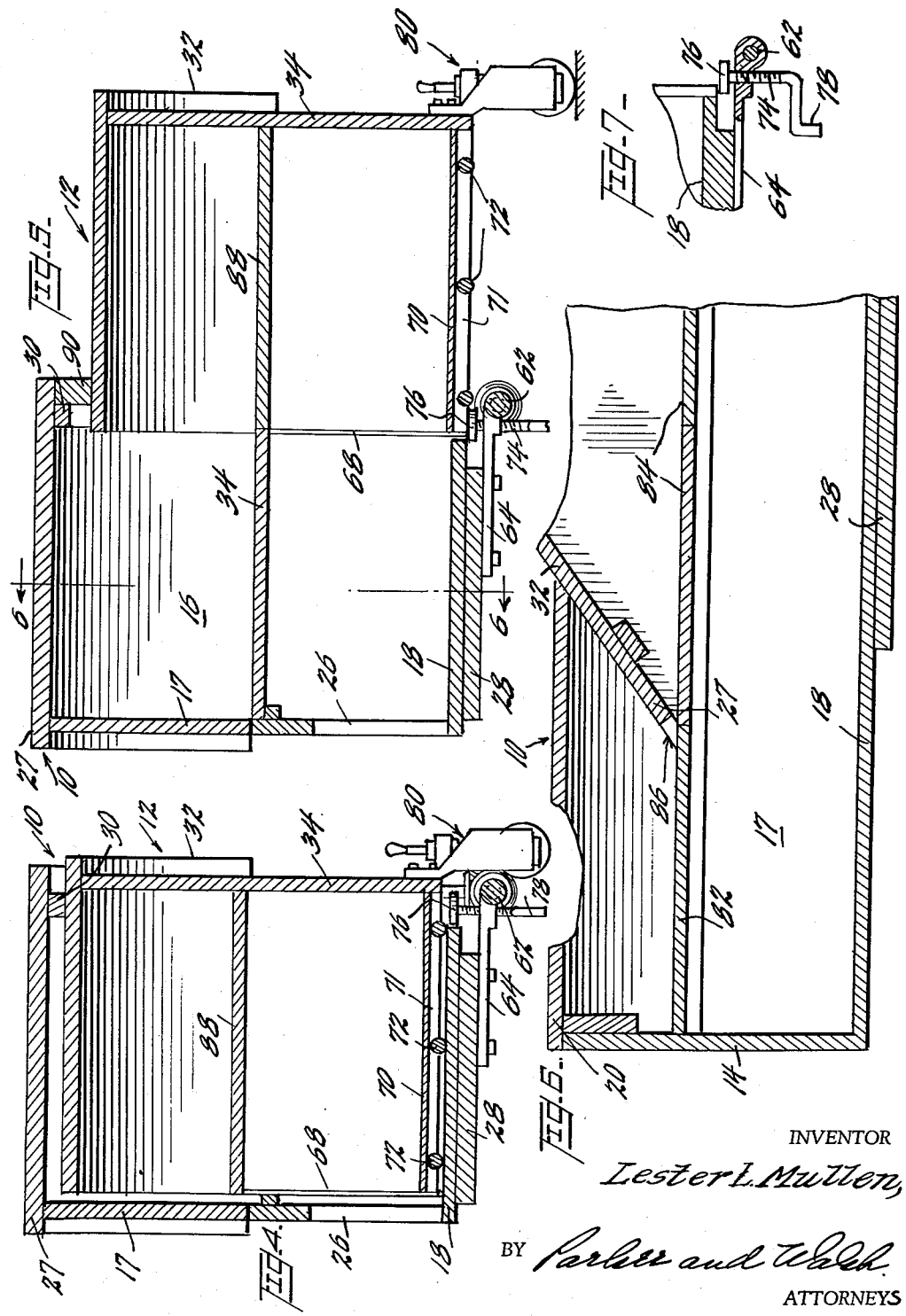

United States Patent Office 3,137,041
Patented June 16, 1964

3,137,041
EXPANDABLE HOUSE TRAILER
Lester L. Mullen, Firth, Idaho
Filed Sept. 21, 1962, Ser. No. 225,192
8 Claims. (Cl. 20—2)

This invention relates to house trailers, and in particular to a trailer having a laterally movable section, or wing, which is adapted to be stowed, telescopically, within the limits of the trailer proper, so as to afford a minimized width, for highway travel, and which is movable outwardly to provide additional living space, after the trailer is spotted in its intended location of use.

One chief difficulty in arrangements of this general nature stems from the fact that in spite of sound construction in the separate parts, considerable binding is likely in the telescopic movement, and there are inherent weaknesses in the connection, in expanded condition, and it is a principal object of the invention to remedy these defects. More particularly, it is an object to provide a telescoping action in which the moving wing is held in constant orientation with respect to the main structure during movement of adjustment.

Another problem involved has to do with the need for removing, adjusting, or relocating certain parts to provide necessary clearance in the movements of adjustment, and it is another object of the invention to facilitate such disposition.

In still more particular, it is an object to provide for easy removal and storage of ceiling components in the main compartment of the trailer, and also to provide for overriding the main trailer floor with the floor of the expandable wing, either by a lifting and lowering of the entire wing, or of the floor thereof.

The objects also include the provision of a device which is simple in structure, and facile of operation and reliable in action, and which is easily manufactured, and low in cost.

These and other ends, which will be apparent, are attained by the present invention, which may be briefly described, in one form, as comprising a laterally movable wing, with open, inner end, occupying a side opening in a trailer, and arranged for lateral, sliding movement into and out of the trailer, on rollers, for instance, and having removable, outboard, roller support means, and which is actuated by a screw jack, actuating upper and lower pinions on the trailer engaging with racks on the movable wing, and thus providing four-point support for the wing at all stages of its telescoping movement.

For a more detailed description of the invention, reference is made to the following specification, as illustrated in the drawings, in which:

FIGURE 1 is a side elevational view of the composite trailer, taken on the side having the extendable wing, with the wing stowed within the trailer, FIGURE 2 is a vertical sectional view taken on the plane through the roof apex of the trailer in FIGURE 1, FIGURE 3 is a sectional view through the extendable wing, taken on the horizontal plane of the line 3—3 of FIGURE 2, FIGURE 4 is a vertical section through the wing, taken on the planes of the staggered line 4—4 of FIGURE 2, FIGURE 5 is a view similar to FIGURE 4, showing the wing in extended position, FIGURE 6 is a sectional view, taken on the line 6—6 of FIGURE 5, FIGURE 7 is a fragmentary, sectional view through one of the wing-lifting jacks, taken on the line 7—7 of FIGURE 1, and FIGURE 8 is an elevational view of one side of the extendable wing, showing the upper and lower racks.

Referring to the drawings by characters of reference, there is shown an elongate trailer, indicated as a whole by the numeral 10, accommodating a laterally movable wing unit 12. In order to clearly emphasize the features of novelty, the structural elements of the trailer and wing have been indicated in simplified form. Thus, the trailer 10 is indicated as having solid end walls 14, 15, side walls 16, 17, and a solid floor 18, and although the roof 20 is shown as peaked, or A form, it may as well be flat, or arch-form, or of other forms such as those known and used in the art. The main trailer 10 is also shown as mounted on wheel units 22, and as having suitable windows 24, a side door 26 and a central gable 27. To take care of the extra load due to the wing 12, the trailer is provided with an extra, reinforcing base panel 28, below the floor 18.

On the side 16, opposite door 26, the trailer has an opening, framed by timbers 30, of a size and shape to snugly receive the wing when stowed in the trailer. Like the trailer, the wing has a peaked A roof 32, and has an outer wall 34 with a window 36, and two side walls 38, 40. Each side wall of the wing carries a pair of racks 42, 44 (FIGURE 8) at top and bottom, respectively, running the full length of the wing, and at the inner end of the wing, the racks have upward extensions 46, 48, respectively, to allow for adjustment of the wing to different levels without losing the rack and pinion engagement. The racks on the two wings are the same except for being arranged in right and left hand senses.

For actuation of the racks, to move the wing laterally of the trailer, the trailer carries a pinion unit 50 adjacent the wing-receiving opening in wall 16. Each unit 50 comprises a vertical shaft 52, journalled in a pair of brackets 54 secured to the trailer wall 16, to which shaft is keyed a pair of pinions 56 engaging the upper and lower rack. Keyed to the lower end of each shaft 52 is a bevel gear 58, engaging one of a pair of bevel gears 60, carried at opposite ends of a horizontal shaft 62, journalled in a pair of brackets 64, secured to the underside of reinforcing base slab 28 of the trailer. One end 66 of shaft 62 is square in cross section for application of a suitable wrench or crank, and since the shaft 62 in necessarily in close proximity to the trailer, a wrench of the ratchet type is preferable, to avoid repeated removal and replacement of the wrench.

For limiting outward movement of the wing, it is provided at its inner, vertical edges with a pair of flange plates 68, which engage the inside of wall 16 of the trailer at the outermost position of the wing.

For ease of sliding movement, the wing is provided on the underside of its floor 70 with a series of suitably journalled rollers 72. While the rollers are shown as trunnioned in channels 71 in the underside of the floor 70, they may be mounted in various other ways, such as between floor joists. As seen in FIGURE 4, the rollers 72 rest on floor 18 of the trailer when the wing is in stowed position, but after the wing has been fully extended, in response to a cranking operation, the wing drops to the position shown in FIGURE 5, wherein the surface of floor 70 of the wing is flush with floor 18 of the trailer.

Raising and lowering of the wing for the change of level is conveniently accomplished through a pair of screw jacks 74, threaded in brackets 64, and having supporting heads 76 and cranks 78. Outboard support for the wing during extension is provided in a conventional type of vertically adjustable, landing gear wheel, indicated generally by the numeral 80, which is also utilized in adjusting the level of the wing.

In addition to the outboard support given by the wheel 80, the wing unit is given rigidity, and freedom from jamming, by the four-point support at the trailer opening, due to the four pinions engaging the rack, and this condition remains unaltered in raising or lowering, due to the vertical extension on the inner ends of the racks.

For stowing the wing, the jack 74 and wheel 80 are operated in the reverse sense to raise the wing, which is then cranked into the trailer by the racks and pinions.

If the trailer is provided with a ceiling, a problem of clearance is involved when the wing is telescoped in. To obviate this difficulty, the ceiling in the central area of the trailer is made in removable sections, which are stowable in the ends of the trailer, above the ceiling. Thus, in FIGURE 2, the trailer is shown as having fixed, ceiling panels 82 in the end sections, and a pair of removable ceiling panels 84 (FIGURE 6) which are placed side-by-side at ceiling level when the wing is out, and which are stowed away above panels 82 (FIGURE 2) when the wing is in. For access to the attic space, to stow the panels, gable 27 has suitable openings 86, just above the ceiling line. The wing 12 has a fixed ceiling 88, which is flush with trailer ceilings 82 and 84 when the wing is out, and lowered. In this position, the space between the gables 27 and 32 may be closed off by suitable timbers 90, abutting the timbers 30, which may be in two pieces, easily stored in the trailer, and quickly mounted by means of stud bolts in timbers 30.

While a certain, preferred form of the invention has been shown and described, various modifications will be apparent, in the light of this disclosure, and the invention should not, therefore, be deemed as limited, except insofar as shell appear from the spirit and scope of the appended claims.

I claim:

1. An expandable trailer vehicle comprising a main unit with bottom, side walls, end walls and a roof, one of said sides having an opening medially of its length, a pair of vertically disposed shafts on opposite sides of said opening, each having a pinion on both ends, a horizontally disposed shaft carried by said trailer, below said opening, bevel gears on the ends of said horizontally disposed shaft mating with bevel gears on the lower ends of said vertically disposed shafts, a movable wing unit telescopically received in said opening, and comprising a floor, an outer wall, two side walls and a roof, an outwardly directed flange on the inner edges of said side walls overlying the perimeter of said opening to provide a stop means, a vertically adjustable outboard support carried by said wing unit, an upper and lower rack on the exterior of each side wall of said wing unit, mating with the respective said pinions, said racks having sections of extra width mating with said pinions in the extended position of said wing unit, and jack means carried by said trailer and adapted to move said wing unit in vertical adjustment.

2. In a device as in claim 1, a ceiling in said trailer having movable sections in the region adjacent said opening, and fixed sections at the ends, having access openings for storing said movable sections above said fixed sections.

3. An expandable trailer vehicle comprising a main unit with bottom, side walls, end walls and a roof, one of said sides having an opening medially of its length, a pair of vertically disposed shafts on opposite sides of said opening, each having a pinion on both ends, a horizontally disposed shaft carried by said trailer, below said opening, bevel gears on the ends of said horizontally disposed shaft mating with bevel gears on the lower ends of said vertically disposed shafts, a movable wing unit telescopically received in said opening, and comprising a floor, an outer wall, two side walls and a roof, an outwardly directed flange on the inner edges of said side walls overlying the perimeter of said opening to provide a stop means, a vertically adjustable outboard support carried by said wing unit, and an upper and lower rack on the exterior of each side wall of said wing unit, mating with the respective said pinions, said racks having sections of extra width mating with said pinions in the extended position of said wing unit.

4. An expandable trailer vehicle comprising a main unit with bottom, side walls, end walls and a roof, one of said sides having an opening, a pair of vertically disposed shafts on opposite sides of said opening, each having a pinion on both ends, a horizontally disposed shaft carried by said trailer, below said opening, bevel gears on the ends of said horizontally disposed shaft mating with bevel gears on the lower ends of said vertically disposed shafts, a movable wing unit telescopically received in said opening, and comprising a floor, an outer wall, two side walls and a roof, an outwardly directed flange on the inner edges of said side walls overlying the perimeter of said opening to provide a stop means, a vertically adjustable outboard support carried by said wing unit, and an upper and lower rack on the exterior of each side wall of said wing unit, mating with the respective said pinions, said racks having sections of extra width mating with said pinions in the extended position of said wing unit.

5. An expandable trailer vehicle comprising a main unit with bottom, side walls, end walls and a roof, one of said sides having an opening, a pair of vertically disposed shafts on opposite sides of said opening, each having a pinion on both ends, a horizontally disposed shaft carried by said trailer, below said opening, means to communicate rotation from said horizontally disposed shaft to said vertically disposed shafts, a movable wing unit telescopically received in said opening, and comprising a floor, an outer wall, two side walls and a roof, an outwardly directed flange on the inner edges of said side walls overlying the perimeter of said opening to provide a stop means, a vertically adjustable outboard support carried by said wing unit, and an upper and lower rack on the exterior of each side wall of said wing unit, mating with the respective said pinions, said racks having sections of extra width mating with said pinions in the extended position of said wing unit.

6. An expandable trailer vehicle comprising a main unit with bottom, side walls, end walls and a roof, one of said sides having an opening, a pair of vertically disposed shafts on opposite sides of said opening, each having a pinion on both ends, a horizontally disposed shaft carried by said trailer, below said opening, means to communicate rotation from said horizontally disposed shaft to said vertically disposed shafts, a movable wing unit telescopically received in said openings, and comprising a floor, an outer wall, two side walls and a roof, an outwardly directed flange on the inner edges of said side walls overlying the perimeter of said opening to provide a stop means, an outboard support carried by said wing unit, and an upper and lower rack on the exterior of each side wall of said wing unit, mating with the respective said pinions, said racks having sections of extra width mating with said pinions in the extended position of said wing unit.

7. An expandable trailer vehicle comprising a main unit with bottom, side walls, end walls and a roof, one of said sides having an opening, a pair of vertically disposed shafts on opposite sides of said opening, each having a pinion on both ends, a horizontally disposed shaft carried by said trailer, below said opening, means to communicate rotation from said horizontally disposed shaft to said vertically disposed shafts, a movable wing unit telescopically received in said opening, and comprising a floor, an outer wall, two side walls and a roof, means limiting outward movement of said wing unit, an outboard support carried by said wing unit, and an upper and lower rack on the exterior of each side wall of said wing unit, mating with the respective said pinions, said racks having sections of extra width mating with said pinions in the extended position of said wing unit.

8. An expandable trailer vehicle comprising a main unit with bottom, side walls, end walls and a roof, one of said sides having an opening, a pair of vertically disposed shafts on opposite sides of said opening, each having a pinion on both ends, a horizontally disposed shaft carried by said trailer, below said opening, means to communicate rotation from said horizontally disposed shaft to said vertically disposed shafts, a movable wing unit telescopically received in said opening, and comprising a floor, an outer wall, two side walls and a roof, means limiting outward movement of said wing unit, and an upper and lower rack on the exterior of each side wall of said wing unit, mating with the respective said pinions, said racks having sections of extra width mating with said pinions in the extended position of said wing unit.

References Cited in the file of this patent
UNITED STATES PATENTS

| | | |
|---|---|---|
| 2,225,319 | Rollo | Dec. 17, 1940 |
| 2,494,680 | Wiley | Jan. 17, 1950 |
| 2,813,747 | Rice | Nov. 19, 1957 |